(12) United States Patent
Abdel-Khalik

(10) Patent No.: US 10,942,500 B2
(45) Date of Patent: Mar. 9, 2021

(54) SYSTEM ARCHITECTURE AND METHOD OF PROCESSING DATA THEREIN

(71) Applicant: Purdue Research Foundation, West Lafayette, IN (US)

(72) Inventor: Hany S. Abdel-Khalik, Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 0 days.

(21) Appl. No.: 16/363,283

(22) Filed: Mar. 25, 2019

(65) Prior Publication Data

US 2019/0377311 A1 Dec. 12, 2019

Related U.S. Application Data

(60) Provisional application No. 62/683,017, filed on Jun. 11, 2018.

(51) Int. Cl.

| | |
|---|---|
| *G05B 19/042* | (2006.01) |
| *H04L 29/06* | (2006.01) |
| *G06F 21/55* | (2013.01) |
| *G05B 19/418* | (2006.01) |
| *G06F 21/85* | (2013.01) |
| *G06F 17/18* | (2006.01) |

(Continued)

(52) U.S. Cl.
CPC ......... *G05B 19/0425* (2013.01); *G05B 17/02* (2013.01); *G05B 19/4185* (2013.01); *G06F 17/18* (2013.01); *G06F 21/552* (2013.01); *G06F 21/85* (2013.01); *G06K 9/66* (2013.01); *H04L 63/1416* (2013.01); *H04L 63/1425* (2013.01)

(58) Field of Classification Search
CPC ............... G05B 19/0425; G05B 17/02; G05B 19/4185; G06K 9/66; G06F 17/18; G06F 21/85; G06F 21/552; G06F 21/55; H04L 63/1416; H04L 63/1425
See application file for complete search history.

(56) References Cited

U.S. PATENT DOCUMENTS

| | | | |
|---|---|---|---|
| 2011/0072506 A1* | 3/2011 | Law | H04L 63/0227 726/11 |
| 2012/0129865 A1* | 5/2012 | Wang | C07D 471/06 514/248 |

(Continued)

*Primary Examiner* — Ziaul Karim
(74) *Attorney, Agent, or Firm* — Purdue Research Foundation

(57) ABSTRACT

A system architecture encoded on a non-transitory computer readable medium, the system architecture includes a first protocol. The first protocol is configured to receive a plurality of outputs from an ICS used in controlling an industrial system. The first protocol is configured to receive a plurality of inputs from a physical module. The physical module includes at least one of a component, a sensor, or the ICS. Additionally, the system architecture includes a second protocol, wherein the second protocol is configured to validate the plurality of inputs from the first protocol. Moreover, the system architectures includes a third protocol, wherein the third protocol is configured to validate the plurality of outputs from the first protocol. Further, the system architecture includes a fourth protocol, wherein the fourth protocol is configured to manage the ICS based on the second protocol and the third protocol.

19 Claims, 1 Drawing Sheet

Figure 1

(51) Int. Cl.
*G06K 9/66* (2006.01)
*G05B 17/02* (2006.01)

(56) References Cited

U.S. PATENT DOCUMENTS

| | | | | |
|---|---|---|---|---|
| 2013/0031037 A1* | 1/2013 | Brandt | ................ | H04L 63/1408 706/12 |
| 2014/0297053 A1* | 10/2014 | Morgan | ................ | G05B 17/02 700/288 |
| 2015/0317739 A1* | 11/2015 | Lawlor | ................ | G06Q 40/08 705/4 |

* cited by examiner

SYSTEM ARCHITECTURE AND METHOD OF PROCESSING DATA THEREIN

CROSS-REFERENCE TO RELATED APPLICATIONS

The present U.S. Patent Application is related to and claims the priority benefit of U.S. Provisional Patent Application Ser. No. 62/683,017, filed Jun. 11, 2018, the contents of which is hereby incorporated by reference in its entirety into this disclosure.

GOVERNMENT RIGHTS

This invention was made with Government support under Contract No. DE-NA0003525 between Sandia Corporation and the U.S. Department of Energy. The Government has certain rights in the invention.

BACKGROUND

This section introduces aspects that may help facilitate a better understanding of the disclosure. Accordingly, these statements are to be read in this light and are not to be understood as admissions about what is or is not prior art.

With recent modernization efforts of industrial control systems switching from analog to digital, new engineering safety-related vulnerabilities could be recognized by technically-able adversaries and exploited to escalate normal operational transients to a wide range of malicious scenarios. By way of an example in the nuclear industry, digitization of feed water control in many operating nuclear pressurized water reactors could be exploited during attacks by closing down the feed water control valve leading to reduction or termination of the main feed water. Since such events are viewed as "anticipated transients" (Condition II events), the implication is that the actual cause of such exploited events could go unnoticed by careful manipulation of the data displayed to the operators leading to partial or complete stoppage of the main feed water. The result of such manipulation could vary from a basic denial of service attack resulting from reactor trip or it can be converted and escalated to beyond design basis accident if in addition to main feed water control the auxiliary feed water is interrupted; the cause of such interruption can also go unnoticed by the reactor operator. If the control room traffic is captured by attackers, existing reactor control would remain defenseless against these types of deliberately-escalated accident events.

This type of problem is not unique to nuclear power reactors; however a wide range of industrial control systems may be subject to having their control room traffic manipulated for malicious purposes. These types of control systems share two characteristics that render them vulnerable to deception attacks—a) their technical know-how is well understood by adversaries as they represent essential components of the critical infrastructure of most developed countries; and b) their control traffic, including sensors and commands to actuators are not typically encrypted due to safety reasons. Implication is that state-sponsored adversaries are expected to have sufficiently accurate models that can be used to design attack scenarios that bypass detection using conventional methods such as outlier/anomaly detection and physics conservation principles. It is also possible that they collude with insiders to gain access to the engineering models used in support of design, safety, and operation of the systems.

Various embodiments of the present application relate to a number of algorithms that automate the detection of intrusion into at least one of supervisory control and data acquisition (SCADA) systems, digital control systems, or industrial control systems (ICS).

SUMMARY

This application will render a system that embodies a number of algorithms to automate the detection of intrusion into an industrial control system used to manage, supervise, and operate industrial systems, such as nuclear power plants, chemical plants, water treatment facilities, oil and gas plants, etc. Industrial control systems continuously collect performance data about the systems using distributed sensors, and continuously issues commands to actuators to keep the system operating per design specifications. Access to industrial control systems is currently being protected using information security measures, collectively referred to as perimeter defenses (e.g., routers, firewalls, cryptography, etc.), which are designed to stop unauthorized access. This application provides a new layer of defense when perimeter defenses have been bypassed in order to protect industrial control systems from malicious manipulation, which could be done via systematic falsification of the performance data and/or modification of the commands to actuators.

This application recognizes a stringent need for a defensive measure that can protect critical infrastructures when their perimeter defenses have been bypassed, and can actively monitor and assess in real-time the ICS traffic, including both sensors readings and actuated controls to ensure that all traffic is genuine, meaning that it is resulting from normal system operation and/or response to anticipated transients and possible accidents. The extant techniques for defending against such attacks, currently being employed, or expected for deployment in near future, rely on passive monitoring of control room traffic. Passive monitoring implies a watch-and-learn approach, in which statistical and/or machine learning techniques are employed to go through all data to find signatures that can be used as measure of data trustworthiness. If the attacker gains access to same data used by defender, including ICS traffic and the engineering models, this type of defense can be potentially bypassed.

One aspect of the present application relates to a system architecture encoded on a non-transitory computer readable medium, the system architecture includes a first protocol. The first protocol is configured to receive a plurality of outputs from an ICS used in controlling an industrial system. The first protocol is configured to receive a plurality of inputs from a physical module. The physical module includes at least one of a component, a sensor, or the ICS. Additionally, the system architecture includes a second protocol, wherein the second protocol is configured to validate the plurality of inputs from the first protocol. Moreover, the system architectures includes a third protocol, wherein the third protocol is configured to validate the plurality of outputs from the first protocol. Further, the system architecture includes a fourth protocol, wherein the fourth protocol is configured to manage the ICS based on the second protocol and the third protocol.

Another aspect of the present application relates to a system architecture encoded on a non-transitory computer readable medium, the system architecture includes a first protocol. The first protocol is configured to receive a plurality of outputs from an ICS used in controlling an industrial system. The first protocol is configured to receive a plurality of inputs from a physical module. The physical module includes at least one of a component, a sensor, or the ICS. Additionally, the system architecture includes a second protocol, wherein the second protocol is configured to validate the plurality of inputs from the first protocol. Moreover, the system architectures includes a third protocol, wherein the third protocol is configured to validate the plurality of outputs from the first protocol. Further, the system architecture includes a fourth protocol, wherein the fourth protocol is configured to manage the ICS based on the second protocol and the third protocol. The second protocol includes a reference protocol, wherein the reference protocol is configured to calculate perturbations for the plurality of inputs from the first protocol. Additionally, the second protocol includes a fifth protocol, wherein the fifth protocol is configured to introduce the perturbations into the plurality of inputs from the first protocol, thereby producing perturbed plurality of inputs. Moreover, the second protocol includes a sixth protocol, wherein the sixth protocol is configured to compare a first set of the plurality of inputs from the first protocol to a second set of the perturbed plurality of inputs, thereby calculating input discrepancies.

Still another aspect of the present application relates to a system architecture encoded on a non-transitory computer readable medium, the system architecture includes a first protocol. The first protocol is configured to receive a plurality of outputs from ICS used in controlling an industrial system. The first protocol is configured to receive a plurality of inputs from a physical module. The physical module includes at least one of a component, a sensor, or the ICS. Additionally, the system architecture includes a second protocol, wherein the second protocol is configured to validate the plurality of inputs from the first protocol. Moreover, the system architectures includes a third protocol, wherein the third protocol is configured to validate the plurality of outputs from the first protocol. Further, the system architecture includes a fourth protocol, wherein the fourth protocol is configured to manage the ICS based on the second protocol and the third protocol. The second protocol includes a reference protocol, wherein the reference protocol is configured to calculate perturbations for the plurality of inputs from the first protocol. Additionally, the second protocol includes a fifth protocol, wherein the fifth protocol is configured to introduce the perturbations into the plurality of inputs from the first protocol, thereby producing perturbed plurality of inputs. Moreover, the second protocol includes a sixth protocol, wherein the sixth protocol is configured to compare a first set of the plurality of inputs from the first protocol to a second set of the perturbed plurality of inputs, thereby calculating input discrepancies. The plurality of inputs includes at least one process parameter, and at least one indicator of a component status

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry, various features may not be drawn to scale and are used for illustration purposes only. In fact, the dimensions of the various features in the drawings may be arbitrarily increased or reduced for clarity of discussion.

DETAILED DESCRIPTION

Figure 1:
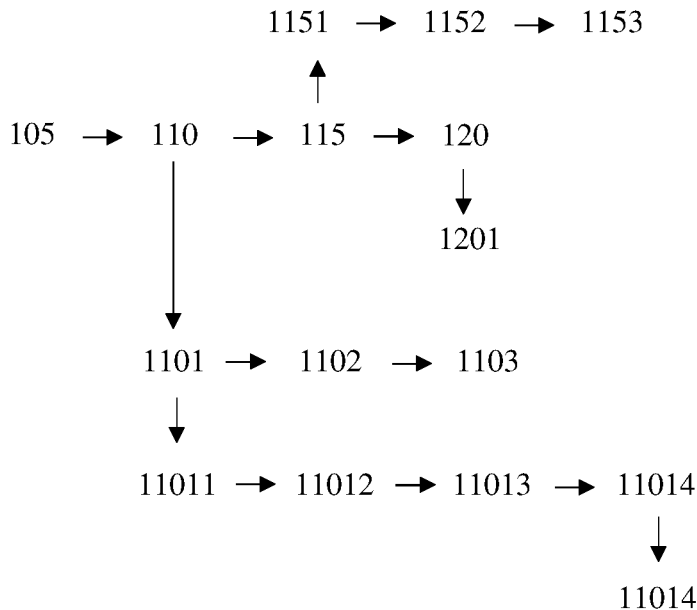
FIG. 1 illustrates a method 100 of processing data, in accordance with one or more embodiments.

The following disclosure provides many different embodiments, or examples, for implementing different features of the present application. Specific examples of components and arrangements are described below to simplify the present disclosure. These are examples and are not intended to be limiting. The making and using of illustrative embodiments are discussed in detail below. It should be appreciated, however, that the disclosure provides many applicable concepts that can be embodied in a wide variety of specific contexts. In at least some embodiments, one or more embodiment(s) detailed herein and/or variations thereof are combinable with one or more embodiment(s) herein and/or variations thereof.

Various embodiments of the present application relate to a software system to automate the process of active monitoring/assessment, by designing algorithms for active control, and the associated analysis of control room traffic. Active control is a new technology introduced to determine whether an intrusion has commandeered the control of various system components such as, for nuclear reactors, reactivity control devices, engineered safety systems actuation, valves alignments, etc. This will be done in a manner that keeps the functionality of existing control while providing a credible approach by which intrusion can be detected.

The algorithms employ concept of active monitoring as opposed to passive monitoring. In passive monitoring, the goal is to continuously monitor ICS traffic (including both sensors readings and commands to actuators) to determine whether their behavior is consistent with expected variations. Passive monitoring can be ultimately bypassed by technically-able adversaries, as they are expected to possess the system's know-how and can develop computer models that mimic behavior to high degree of accuracy, which can be used to falsify ICS traffic without alerting operators. Active monitoring, however, introduces small perturbations to ICS traffic, designed to be small enough as not to impact system performance, but can be leveraged to generate new signatures that are known only to the defender, and thus can be used to detect intrusion. These perturbations can be identified using a number of mathematical techniques, collectively referred to as reduced order modeling (ROM) techniques, which can identify perturbations with negligible impact on system performance. The signatures represent mathematical functions of the all the data comprising the ICS traffic, including sensors readings and commands variations over space and time, which can be harvested using data mining techniques.

Various embodiments of the present application embodies three modules: (1) Identify active perturbations. This module is designed to execute the system's engineering model many times in an off-line mode to search for the optimum perturbations using reduced order modeling techniques. The engineering model is not part of this application and will be system-dependent. ROM techniques are well-established in the literature, and are typically used to reduced complexity of a given model by identifying perturbations with maximal impact on system behavior. In this application, ROM is used to search for the perturbations with weak impact on system performance. (2) Identify Signatures. This module will employ conventional data mining techniques to identify in an off-line mode mathematical relationships between the identified perturbations (generated by the first module) and sensors variations over the combined spatial-temporal phase space. (3) Detect Signatures. This module will be executed in an online mode to compare the signatures identified by the second module to the online ICS traffic.

Different from passive monitoring, various embodiments of the present application will allow early detection of intrusion that attempt to learn system behavior during an initial lie-in-wait period. For sufficiently complex and stealth attacks, the attackers typically excite the system with small perturbations initially to learn system behavior before launching their attack. These perturbations are selected to have small impact on system behavior and designed to be consistent with normal operational manoeuvers, to avoid detection by operators. Active monitoring will detect these intrusion attempts early on as the attacker's introduced perturbations will not be consistent with those developed by the first module of the active monitoring system.

Example 1: A system architecture includes a first protocol. The first protocol is configured to receive a plurality of outputs from a ICS used in controlling an industrial system. The first protocol is also configured to receive a plurality of inputs from a physical module. In one or more embodiments, the physical module comprises at least one of a component, a sensor, or the ICS. The system architecture also includes a second protocol, where the second protocol is configured to validate the plurality of inputs from the first protocol.

Additionally, the system architecture includes a third protocol, where the third protocol is configured to validate the plurality of outputs from the first protocol. Lastly, the system architecture includes a fourth protocol, where the fourth protocol is configured to manage the ICS based on the second protocol and the third protocol.

The plurality of inputs include at least one process parameter of a sensor, and at least one indicator of a component status. The process parameter provides contemporaneous reading from the sensor, while the at least one indicator includes a contemporaneous indicator of a component state. The component state includes at least one of active/inactive component state, open/closed component state, or on/off component state. The components include at least one of a safety system, a pump, a valve, an actuator, a control rod drive, or a control material dispersion system.

The plurality of outputs includes at least one operating command to the component or an expected state for the component.

The second protocol, which validates the plurality of inputs from the first protocol, includes a reference protocol, a fifth protocol, and a sixth protocol. The reference protocol is configured to calculate perturbations for the plurality of inputs from the first protocol. In one or more embodiments, these perturbations are a consequence of variances produced when a hacker is attempting to manipulate and/or sabotage and/or control the plurality of inputs. The reference protocol calculates these perturbations in accordance with a set of modules discussed in the section titled "The Reference Protocol."

Going back to the second protocol, the second protocol includes the fifth protocol, where the fifth protocol is configured to introduce the perturbations into the plurality of inputs from the first protocol, thereby producing perturbed plurality of inputs. The second protocol further includes a sixth protocol, where the sixth protocol is configured to compare a first set of the plurality of inputs from the first protocol to a second set of the perturbed plurality of inputs, thereby calculating input discrepancies.

The Reference Protocol: As previously discussed, the reference protocol calculates perturbations for the plurality of inputs from the first protocol. The reference protocol includes a first module, a second module, a third module, and a fourth module.

The first module is configured to simulate using a predetermined system model. The predetermined system model includes a description of at least one relationship between the plurality of inputs and the plurality of outputs under normal operating conditions, and accident conditions.

The second module is configured to execute the predetermined system model by randomizing at least one of the plurality of inputs or the plurality of outputs, thereby producing various realizations of the plurality of inputs and the plurality of outputs.

The third module is configured to identify candidate perturbations from the various realizations. The candidate perturbations are calculated from the various realizations using any number of data reduction and/or dimensionality reduction techniques such as reduced order modeling, singular value decomposition, principal component analysis, fourier transform, parametric and/or parametric projection pursuit algorithms, etc. In one or more embodiments, an idea here is to identify not only the most dominant correlations, referred to as low order correlations, as typically identified by these aforementioned techniques, but also the non-influential correlations referred to as high order correlations and their joint probability distribution. For example, if one is using the singular value decomposition as applied to the probability matrix of the various realizations, one typically calculates a left singular matrix. The first few columns represent the low order correlations and the latter columns represent the higher order correlations. The higher order correlations are selected such that their variations are consistent with the noise level for their respective physical variables. For example, if the respective variable is the flowrate in a given pipe, the high order correlation must have variations that are consistent with the normal noise expected for flowrate measurements.

The candidate perturbations in this case are a set composed of some of both low and high order correlations. Each correlation is referenced by its own index as enumerated by the dimensionality reduction algorithm. For example, in singular value decomposition, index 1 corresponds to the lowest order correlations (i.e., the most dominant), and index N corresponds to the highest order correlation, where N is the number of random realizations.

The reference protocol further includes a fourth module, where the fourth is configured to process the candidate perturbations using data mining techniques, thereby selecting a second set of the candidate perturbations. In one or more embodiments, the second set of the candidate perturbations is smaller than the candidate perturbations. The second set of perturbations represent mathematical transformations of the low and high order correlations generated by the third module. Both parametric and nonparametric techniques could be used to calculate two new variables, denoted by pseudo low order and pseudo high order variables. The pseudo low order variable is a function of the low order correlations selected by the third module, and the pseudo high order variable is a function of the high order correlations selected by the third module. The function can be either parametric or nonparametric. Parametric functions include response surface methods, polynomial functions, orthogonal functions, etc. Nonparametric functions include alternating conditional estimation, projection pursuit algorithms, etc.

A joint probability density function (PDF) is generated between the pseudo low order and high order variables using available random realizations. This PDF will depend on the indices selected by the third module for the low and high order correlation, and the parametric or nonparametric approach employed to determine the pseudo high and low order variables.

The fourth module further includes an objective function, where the objective function is configured to reduce occurrences of false positives, maximize detectability of intrusion, and eliminate impact of the industrial system. This objective function calculates the mutual information between the pseudo low and high order variables calculated by the fourth module. Optimization techniques, such as gradient-descent, or Monte Carlo search techniques, are employed to select the best parametric or nonparametric dependence for the low and high order pseudo variables. The criterion of the optimization is to maximize the mutual information between the pseudo low and high order variables. The objective function is designed to select according to an encrypted formula the indices of the low and high order correlations that are used to calculate the pseudo variables. This can be achieved by pre-assigning a zero or one weight to each correlation index before it gets processed by the optimization algorithm.

Going back to the system architecture we discuss the third protocol, where the third protocol is configured to validate the plurality of outputs from the first protocol. The third protocol includes an output reference protocol, a seventh protocol, and an eighth protocol. The output reference protocol is configured to calculate output perturbations for the plurality of outputs from the first protocol. The seventh protocol is configured to introduce the output perturbations into the plurality of outputs from the first protocol, thereby producing perturbed plurality of outputs. Lastly, the eighth protocol is configured to compare a first set of the plurality of outputs from the first protocol to a second set of the perturbed plurality of outputs, thereby calculating output discrepancies. In at least one embodiment, the output reference protocol is similar to the reference protocol discussed above.

Going back to the system architecture we discuss the fourth protocol, wherein the fourth protocol is configured to manage the ICS based on the second protocol and the third protocol. The fourth protocol includes a classifier function. The classifier function is configured to perform at least one of an alpha function or a beta function. The alpha function includes classifying the input discrepancies relative to a known industrial system noise of the plurality of inputs and the perturbations from the reference protocol. The beta function includes classifying the output discrepancies relative to a known industrial system noise of the plurality of outputs and the output perturbations from the output reference protocol. The classifier function performs at least one of the above functions by using the pseudo low and high order variables generated in the reference protocol (or the output reference protocol). Their joint PDFs are employed to calculate the probability of consistency between the pseudo high and low order correlations based on a user-selected threshold. In some embodiments, the input discrepancies are inconsistent with the perturbations and/or the output discrepancies are inconsistent with the output perturbations. In some embodiments, the input discrepancies are consistent with the perturbations and the output discrepancies are consistent with the output perturbations.

Example 2: A system architecture includes a method 100. Method 100 includes a first protocol. The first protocol receives 105 a plurality of outputs from an ICS used in controlling an industrial system, and also receives a plurality of inputs from a physical module. In one or more embodiments, the physical module comprises at least one of a component, a sensor, or the ICS. The system architecture also includes a second protocol, where the second protocol validates 110 the plurality of inputs from the first protocol.

Additionally, the system architecture includes a third protocol, where the third protocol validates 115 the plurality of outputs from the first protocol. Lastly, the system architecture includes a fourth protocol, where the fourth protocol manages 120 the ICS based on the second protocol and the third protocol.

The plurality of inputs include at least one process parameter of a sensor, and at least one indicator of a component status. The process parameter provides contemporaneous reading from the sensor, while the at least one indicator includes a contemporaneous indicator of a component state. The component state includes at least one of active/inactive component state, open/closed component state, or on/off component state. The components include at least one of a safety system, a pump, a valve, an actuator, a control rod drive, or a control material dispersion system.

The plurality of outputs includes at least one operating command to the component or an expected state for the component.

The second protocol, which validates the plurality of inputs from the first protocol, includes a reference protocol, a fifth protocol, and a sixth protocol. The reference protocol calculates 1101 perturbations for the plurality of inputs from the first protocol. In one or more embodiments, these perturbations are a consequence of variances produced when a hacker is attempting to manipulate and/or sabotage and/or control the plurality of inputs. The reference protocol calculates these perturbations in accordance with a set of modules discussed in the section titled "The Reference Protocol."

Going back to the second protocol, the second protocol includes the fifth protocol, where the fifth protocol introduces 1102 the perturbations into the plurality of inputs from the first protocol, thereby producing perturbed plurality of inputs. The second protocol further includes a sixth protocol, where the sixth protocol compares 1103 a first set of the plurality of inputs from the first protocol to a second set of the perturbed plurality of inputs, thereby calculating input discrepancies.

The reference protocol: As previously discussed, the reference protocol calculates perturbations for the plurality of inputs from the first protocol. The reference protocol includes a first module, a second module, a third module, and a fourth module.

The first module simulates 11011 using a predetermined system model. The predetermined system model includes a description of at least one relationship between the plurality of inputs and the plurality of outputs under normal operating conditions, and accident conditions.

The second module executes 11012 the predetermined system model by randomizing at least one of the plurality of inputs or the plurality of outputs, thereby producing various realizations of the plurality of inputs and the plurality of outputs.

The third module identifies 11013 candidate perturbations from the various realizations. The candidate perturbations are calculated from the various realizations using any number of data reduction and/or dimensionality reduction techniques such as reduced order modeling, singular value decomposition, principal component analysis, fourier transform, parametric and/or parametric projection pursuit algorithms, etc. In one or more embodiments, an idea here is to identify not only the most dominant correlations, referred to as low order correlations, as typically identified by these aforementioned techniques, but also the non-influential correlations referred to as high order correlations and their joint probability distribution. For example, if one is using the singular value decomposition as applied to the probability matrix of the various realizations, one typically calculates a left singular matrix. The first few columns represent the low order correlations and the latter columns represent the higher order correlations. The higher order correlations are selected such that their variations are consistent with the noise level for their respective physical variables. For example, if the respective variable is the flowrate in a given pipe, the high order correlation must have variations that are consistent with the normal noise expected for flowrate measurements.

The candidate perturbations in this case are a set composed of some of both low and high order correlations. Each correlation is referenced by its own index as enumerated by the dimensionality reduction algorithm. For example, in singular value decomposition, index 1 corresponds to the lowest order correlations (i.e., the most dominant), and index N corresponds to the highest order correlation, where N is the number of random realizations.

The reference protocol further includes a fourth module, where the fourth processes 11014 the candidate perturbations using data mining techniques, thereby selecting a second set of the candidate perturbations. In one or more embodiments, the second set of the candidate perturbations is smaller than the candidate perturbations. The second set of perturbations represent mathematical transformations of the low and high order correlations generated by the third module. Both parametric and nonparametric techniques could be used to calculate two new variables, denoted by pseudo low order and pseudo high order variables. The pseudo low order variable is a function of the low order correlations selected by the third module, and the pseudo high order variable is a function of the high order correlations selected by the third module. The function can be either parametric or nonparametric. Parametric functions include response surface methods, polynomial functions, orthogonal functions, etc. Nonparametric functions include alternating conditional estimation, projection pursuit algorithms, etc.

A joint probability density function (PDF) is generated between the pseudo low order and high order variables using available random realizations. This PDF will depend on the indices selected by the third module for the low and high order correlation, and the parametric or nonparametric approach employed to determine the pseudo high and low order variables.

The fourth module further includes an objective function, where the objective function reduces 110141 occurrences of false positives, maximize detectability of intrusion, and eliminate impact of the industrial system. This objective function calculates the mutual information between the pseudo low and high order variables calculated by the fourth module. Optimization techniques, such as gradient-descent, or Monte Carlo search techniques, are employed to select the best parametric or nonparametric dependence for the low and high order pseudo variables. The criterion of the optimization is to maximize the mutual information between the pseudo low and high order variables. The objective function is designed to select according to an encrypted formula the indices of the low and high order correlations that are used to calculate the pseudo variables. This can be achieved by pre-assigning a zero or one weight to each correlation index before it gets processed by the optimization algorithm.

Going back to the system architecture we discuss the third protocol, where the third protocol validates the plurality of outputs from the first protocol. The third protocol includes an output reference protocol, a seventh protocol, and an eighth protocol. The output reference protocol calculates 1151 output perturbations for the plurality of outputs from the first protocol. The seventh protocol introduces 1152 the output perturbations into the plurality of outputs from the first protocol, thereby producing perturbed plurality of outputs. Lastly, the eighth protocol compares 1153 a first set of the plurality of outputs from the first protocol to a second set of the perturbed plurality of outputs, thereby calculating output discrepancies. In at least one embodiment, the output reference protocol is similar to the reference protocol discussed above.

Going back to the system architecture we discuss the fourth protocol, wherein the fourth protocol manages the ICS based on the second protocol and the third protocol. The fourth protocol includes a classifier function. The classifier function performs at least one of an alpha function or a beta function. The alpha function classifies the input discrepancies relative to a known industrial system noise of the plurality of inputs and the perturbations from the reference protocol. The beta function classifies the output discrepancies relative to a known industrial system noise of the plurality of outputs and the output perturbations from the output reference protocol. The classifier function performs at least one of the above functions by using the pseudo low and high order variables generated in the reference protocol (or the output reference protocol). Their joint PDFs are employed to calculate the probability of consistency between the pseudo high and low order correlations based on a user-selected threshold. In some embodiments, the input discrepancies are inconsistent with the perturbations and/or the output discrepancies are inconsistent with the output perturbations. In some embodiments, the input discrepancies are consistent with the perturbations and the output discrepancies are consistent with the output perturbations.

One of ordinary skill in the art would recognize that operations are added or removed from method 100, in one or more embodiments. One of ordinary skill in the art would also recognize that the order of the operations in method 100 is varied in various alternative embodiments.

Figure 2:
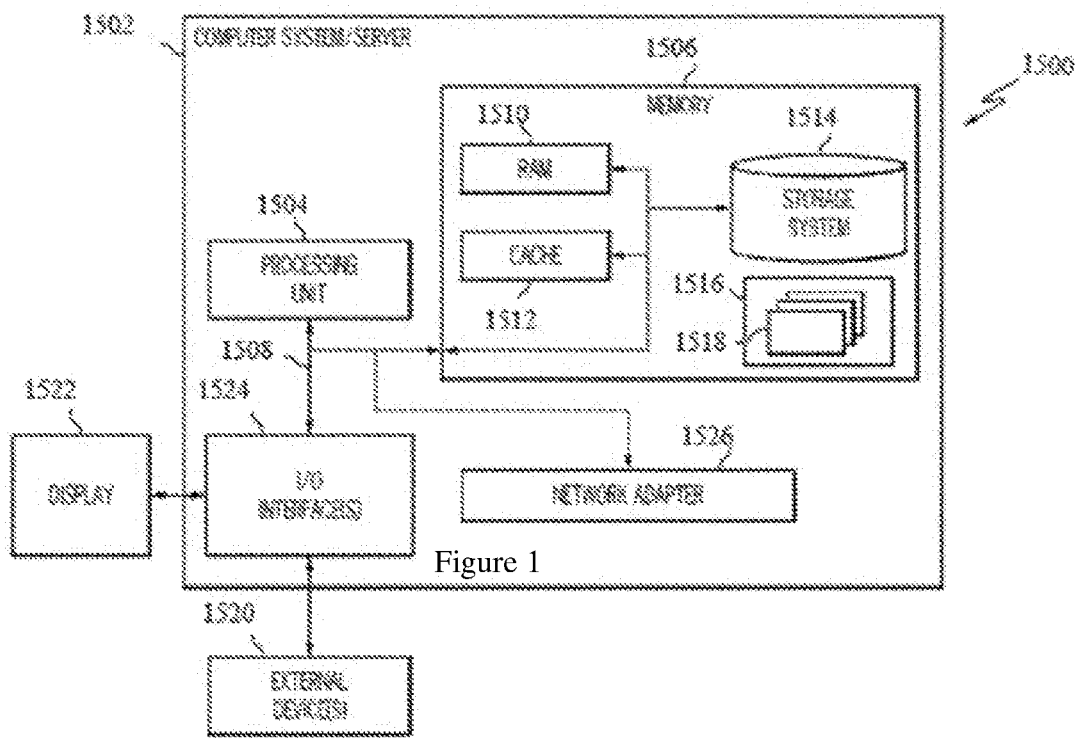
FIG. 2 illustrates one example of a computing or processing node 1500 for operating a method or a software architecture in accordance with the present application.

FIG. 2 illustrates one example of a computing or processing node 1500 for operating the methods and the software architecture of the present application. This is not intended to suggest any limitation as to the scope of use or functionality of embodiments of the invention described herein. Regardless, the computing node 1500 is capable of being implemented and/or performing any of the functionality set forth hereinabove.

In computing node 1500 there is a computer system/server 1502, which is operational with numerous other general purpose or special purpose computing system environments or configurations. Examples of well-known computing systems, environments, and/or configurations that may be suitable for use with computer system/server 1502 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 1502 in cloud computing node 1500 is shown in the form of a general-purpose computing device. The components of computer system/server 1502 may include, but are not limited to, one or more processors or processing units 1504, a system memory 1506, and a bus 1508 that couples various system components including system memory 1506 to processor 1504.

Bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1502 typically includes a variety of computer system readable media. Such media may be any available media that is accessible by computer system/server 1502, and it includes both volatile and non-volatile media, removable and non-removable media.

System memory 1506, in one embodiment, implements the methods and the software architectures of the present application. The system memory 506 can include computer system readable media in the form of volatile memory, such as random access memory (RAM) 1510 and/or cache memory 1512. Computer system/server 1502 may further include other removable/non-removable, volatile/non-volatile computer system storage media. By way of example only, storage system 1514 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1508 by one or more data media interfaces. As will be further depicted and described below, memory 1506 may include at least one program product having a set (e.g., at least one) of program modules that are configured to carry out the functions of various embodiments of the invention.

Program/utility 1516, having a set (at least one) of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of various embodiments of the invention as described herein.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Computer system/server 1502 may also communicate with one or more external devices 1520 such as a keyboard, a pointing device, a display 1522, etc.; one or more devices that enable a user to interact with computer system/server 1502; and/or any devices (e.g., network card, modem, etc.) that enable computer system/server 1502 to communicate with one or more other computing devices. Such communication can occur via I/O interfaces 1524. Still yet, computer system/server 1502 can communicate with one or more networks such as a local area network (LAN), a general wide area network (WAN), and/or a public network (e.g., the Internet) via network adapter 1526. As depicted, network adapter 1526 communicates with the other components of computer system/server 1502 via bus 1508. It should be understood that although not shown, other hardware and/or software components could be used in conjunction with computer system/server 1502. Examples, include, but are not limited to: microcode, device drivers, redundant processing units, external disk drive arrays, RAID systems, tape drives, and data archival storage systems, etc.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, design, machine, manufacture, and composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The invention claimed is:

1. A system architecture encoded on a non-transitory computer readable medium, the system architecture comprising:
   a first protocol, wherein the first protocol is configured to receive a plurality of outputs from an industrial control system (ICS) used in controlling an industrial system, wherein the first protocol is configured to receive a plurality of inputs from a physical module, wherein the physical module comprises at least one of a component, a sensor, or the ICS;
   a second protocol, wherein the second protocol is configured to validate the plurality of inputs from the first protocol, wherein the second protocol comprises;
      a reference protocol, wherein the reference protocol is configured to calculate perturbations for the plurality of inputs from the first protocol;
      a fifth protocol, wherein the fifth protocol is configured to introduce the perturbations into the plurality of inputs from the first protocol, thereby producing perturbed plurality of inputs; and
      a sixth protocol, wherein the sixth protocol is configured to compare a first set of the plurality of inputs from the first protocol to a second set of the perturbed plurality of inputs, thereby calculating input discrepancies;
   a third protocol, wherein the third protocol is configured to validate the plurality of outputs from the first protocol; and
   a fourth protocol, wherein the fourth protocol is configured to manage the ICS based on the second protocol and the third protocol, wherein the fourth protocol comprises:
      a classifier function, wherein the classifier function is configured to perform at least one of an alpha function or a beta function,
      wherein the alpha function comprises classifying the input discrepancies relative to a known industrial system noise of the plurality of inputs and the perturbations from the reference protocol.

2. The system architecture of claim 1, wherein the plurality of inputs comprises at least one process parameter, and at least one indicator of a component status.

3. The system architecture of claim 2, wherein the at least one process parameter comprises a contemporaneous reading from the sensor, and wherein the at least one indicator of the component status comprises a contemporaneous indicator of a component state, wherein the component state comprises at least one of active/inactive component state, open/closed component state, or on/off component state.

4. The system architecture of claim 1, wherein the plurality of outputs comprises at least one operating command to the component or an expected state for the component.

5. The system architecture of claim 4, wherein the component comprises at least one of a safety system, a pump, a valve, an actuator, a control rod drive, or a control material dispersion system.

6. The system architecture of claim 1, wherein the reference protocol comprises:
   a first module, wherein the first module is configured to simulate, using a predetermined system model, wherein the predetermined system model comprises a description of at least one relationship between the plurality of inputs and the plurality of outputs under normal operating conditions, and accident conditions;
   a second module, wherein the second module is configured to execute the predetermined system model by randomizing at least one of the plurality of inputs or the plurality of outputs, thereby producing various realizations of the plurality of inputs and the plurality of outputs;
   a third module, wherein the third module is configured to identify candidate perturbations from the various realizations; and
   a fourth module, wherein the fourth is configured to process the candidate perturbations using data mining techniques, thereby selecting a second set of the candidate perturbations, wherein the second set of the candidate perturbations is smaller than the candidate perturbations.

7. The system architecture of claim 6, wherein fourth module comprises:
   an objective function, wherein the objective function is configured to reduce occurrences of false positives, maximize detectability of intrusion, and eliminate impact of the industrial system.

8. The system architecture of claim 1, wherein the third protocol comprises:
   an output reference protocol, wherein the output reference protocol is configured to calculate output perturbations for the plurality of outputs from the first protocol;
   a seventh protocol, wherein the seventh protocol is configured to introduce the output perturbations into the plurality of outputs from the first protocol, thereby producing perturbed plurality of outputs; and
   an eighth protocol, wherein the eighth protocol is configured to compare a first set of the plurality of outputs from the first protocol to a second set of the perturbed plurality of outputs, thereby calculating output discrepancies.

9. The system architecture of claim 8, wherein the output reference protocol comprises:
   a first module, wherein the first module is configured to simulate, using a predetermined system model, wherein the system model comprises a description of at least one relationship between the plurality of inputs and the plurality of outputs under normal operating conditions, and accident conditions;
   a second module, wherein the second module is configured to execute the predetermined system model by randomizing at least one of the plurality of inputs or the plurality of outputs, thereby producing various realizations of the plurality of inputs and the plurality of outputs;
   a third module, wherein the third module is configured to identify candidate perturbations from the various realizations; and
   a fourth module, wherein the fourth is configured to process the candidate perturbations using data mining techniques, thereby selecting a second set of the candidate perturbations, wherein the second set of the candidate perturbations is smaller than the candidate perturbations.

10. The system architecture of claim 9, wherein fourth module comprises:
    an objective function, wherein the objective function is configured to reduce occurrences of false positives, maximize detectability of intrusion, and eliminate impact of the industrial system.

11. The system architecture of claim 8, wherein the fourth protocol futher comprises:
    wherein the beta function comprises classifying the output discrepancies relative to a known industrial system noise of the plurality of outputs and the output perturbations from the output reference protocol.

12. The system architecture of claim 11, wherein the input discrepancies are inconsistent with the perturbations and/or the output discrepancies are inconsistent with the output perturbations.

13. The system architecture of claim 11, wherein the input discrepancies are consistent with the perturbations and the output discrepancies are consistent with the output perturbations.

14. A system architecture encoded on a non-transitory computer readable medium, the system architecture comprising:
  a first protocol, wherein the first protocol is configured to receive a plurality of outputs from an industrial control system (ICS) used in controlling an industrial system, wherein the first protocol is configured to receive a plurality of inputs from a physical module, wherein the physical module comprises at least one of a component, a sensor, or the ICS;
  a second protocol, wherein the second protocol comprises:
    a reference protocol, wherein the reference protocol is configured to calculate perturbations for the plurality of inputs from the first protocol;
    a fifth protocol, wherein the fifth protocol is configured to introduce the perturbations into the plurality of inputs from the first protocol, thereby producing perturbed plurality of inputs; and
    a sixth protocol, wherein the sixth protocol is configured to compare a first set of the plurality of inputs from the first protocol to a second set of the perturbed plurality of inputs, thereby calculating input discrepancies;
  a third protocol, wherein the third protocol is configured to validate the plurality of outputs from the first protocol; and
  a fourth protocol, wherein the fourth protocol is configured to manage ICS based on the second protocol and the third protocol.

15. The system architecture of claim 14, wherein the plurality of inputs comprises at least one process parameter, and at least one indicator of a component status.

16. The system architecture of claim 15, wherein the at least one process parameter comprises a contemporaneous reading from the sensor, and wherein the at least one indicator of the component status comprises a contemporaneous indicator of a component state, wherein the component state comprises at least one of active/inactive component state, open/closed component state, or on/off component state.

17. The system architecture of claim 14, wherein the plurality of outputs comprises at least one operating command to the component or an expected state for the component.

18. The system architecture of claim 17, wherein the component comprises at least one of a safety system, a pump, a valve, an actuator, a control rod drive, or a control material dispersion system.

19. A system architecture encoded on a non-transitory computer readable medium, the system architecture comprising:
  a first protocol, wherein the first protocol is configured to receive a plurality of outputs from an industrial control system (ICS) used in controlling an industrial system, wherein the first protocol is configured to receive a plurality of inputs from a physical module, wherein the physical module comprises at least one of a component, a sensor, or the ICS;
  a second protocol, wherein the second protocol comprises:
    a reference protocol, wherein the reference protocol is configured to calculate perturbations for the plurality of inputs from the first protocol;
    a fifth protocol, wherein the fifth protocol is configured to introduce the perturbations into the plurality of inputs from the first protocol, thereby producing perturbed plurality of inputs; and
    a sixth protocol, wherein the sixth protocol is configured to compare a first set of the plurality of inputs from the first protocol to a second set of the perturbed plurality of inputs, thereby calculating input discrepancies;
  a third protocol, wherein the third protocol is configured to validate the plurality of outputs from the first protocol; and
  a fourth protocol, wherein the fourth protocol is configured to manage the ICS based on the second protocol and the third protocol,
  wherein the plurality of inputs comprises at least one process parameter, and at least one indicator of a component status.

* * * * *